Nov. 30, 1965    C. L. CASEY    3,220,605
CARD VENDING MACHINE
Filed Sept. 12, 1963    5 Sheets-Sheet 1

INVENTOR:
CHARLES L. CASEY
BY
Merrell, Johnston, Cook & Root
ATT'YS

Nov. 30, 1965 C. L. CASEY 3,220,605
CARD VENDING MACHINE
Filed Sept. 12, 1963 5 Sheets-Sheet 2

INVENTOR:
CHARLES L. CASEY
BY Mazzell, Johnston,
Cook, & Root
ATT'YS

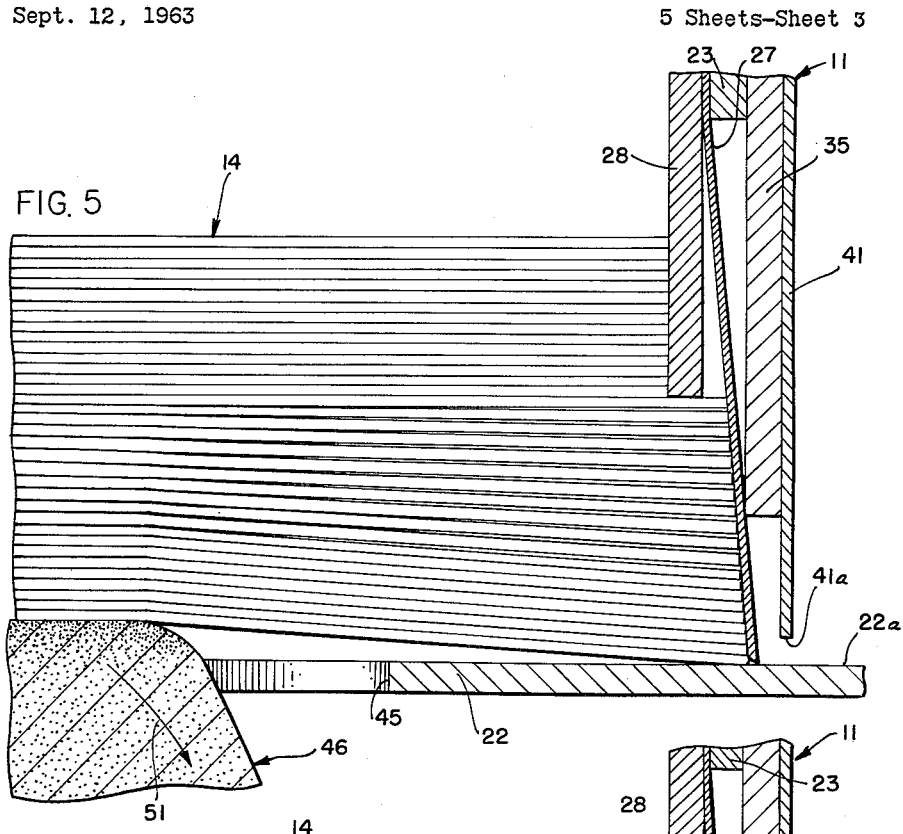
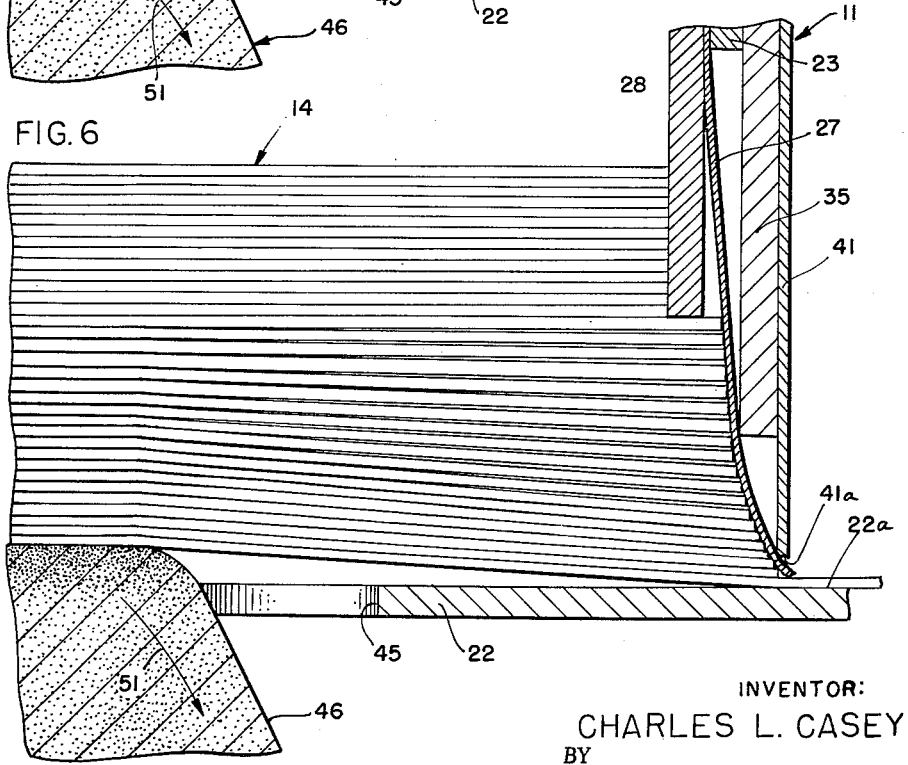

Nov. 30, 1965    C. L. CASEY    3,220,605
CARD VENDING MACHINE
Filed Sept. 12, 1963    5 Sheets-Sheet 4
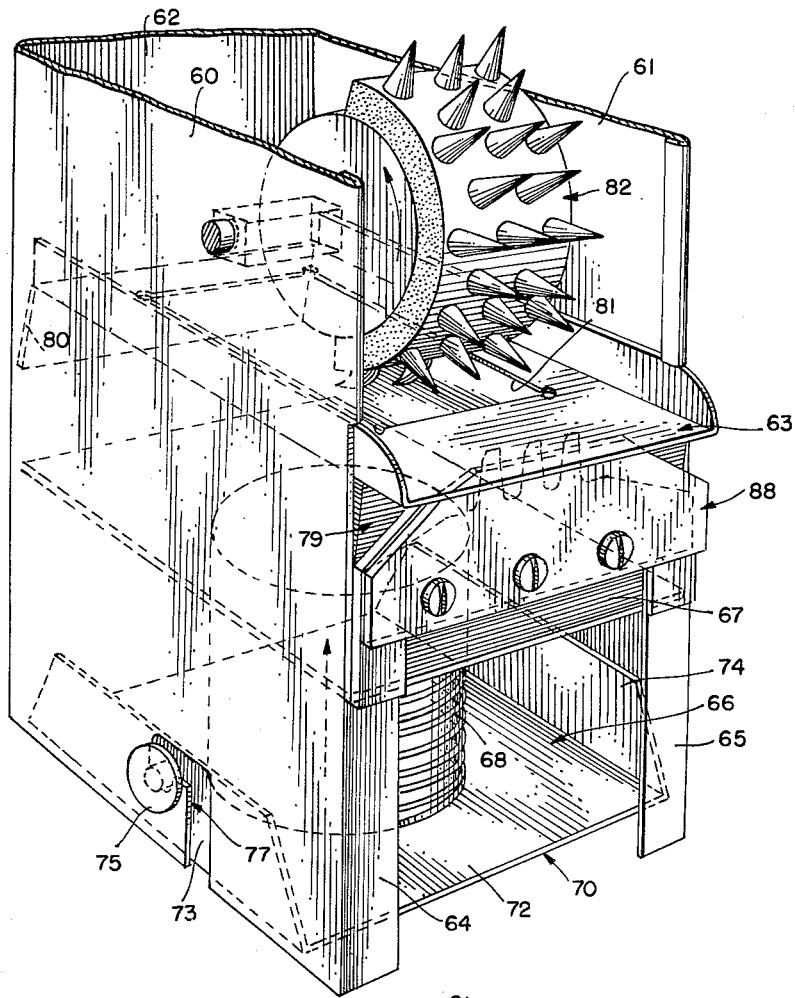
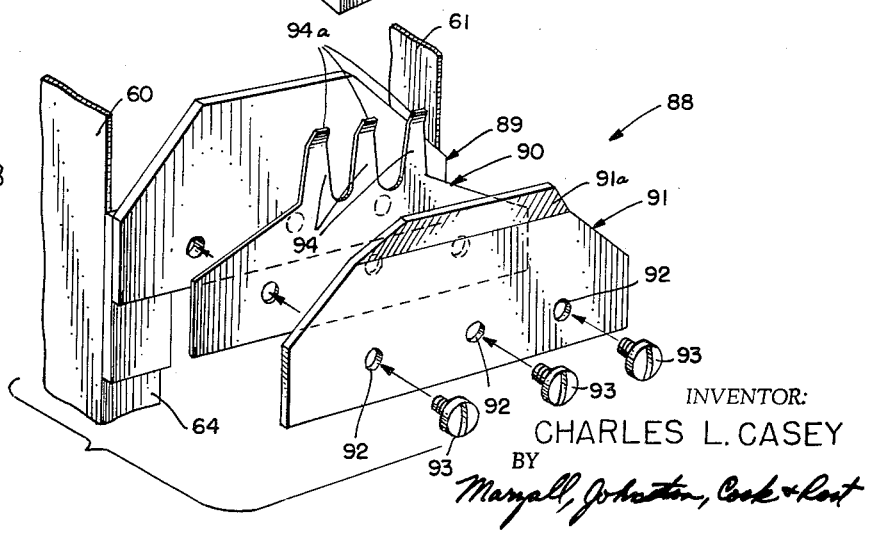
INVENTOR:
CHARLES L. CASEY
BY
Mazyall, Johnston, Cook & Root
ATT'YS Nov. 30, 1965   C. L. CASEY   3,220,605
CARD VENDING MACHINE
Filed Sept. 12, 1963   5 Sheets-Sheet 5
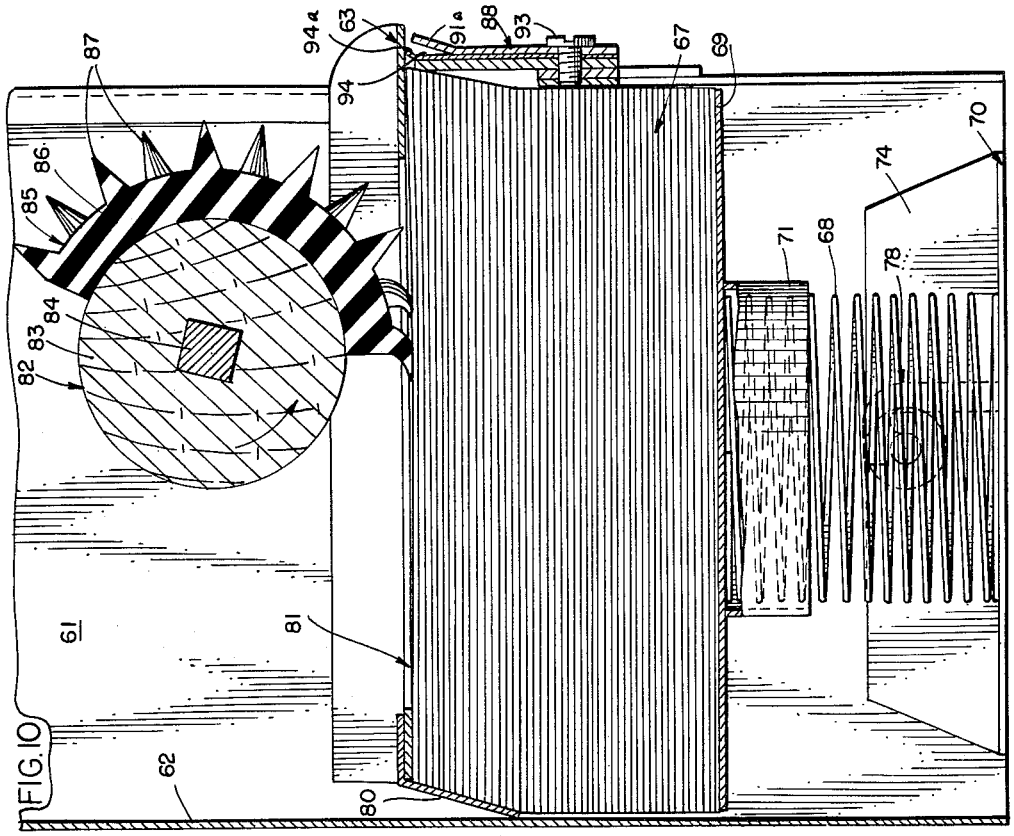
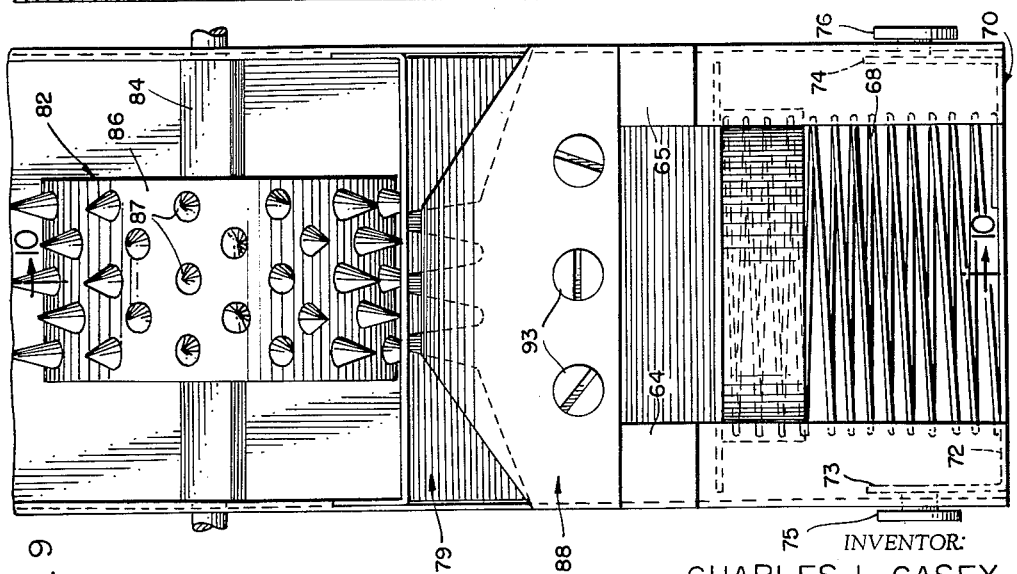
INVENTOR:
CHARLES L. CASEY
BY
Mazall, Johnston, Cook+Root
ATT'YS

United States Patent Office 3,220,605
Patented Nov. 30, 1965

3,220,605
CARD VENDING MACHINE
Charles Leo Casey, Riverside, Ill., assignor to Reliable Engineering Co., Chicago, Ill., a corporation of Illinois
Filed Sept. 12, 1963, Ser. No. 308,470
5 Claims. (Cl. 221—231)

This invention relates in general to a dispensing or vending machine, and more particularly to a machine for dispensing cards one at a time. Still more particularly, the dispensing machine of the present invention is primarily useful in dispensing post cards and may be coin operated if so desired.

Heretofore, many card dispensing machines have been developed, but all have encountered the difficulty of consistently dispensing only a single card at a time. Further, dispensing machines heretofore made encountered difficulty in dispensing the last few cards from a stack as supplied from a magazine.

It is therefore an object of the present invention to obviate the above named difficulties and to provide an improved card dispensing machine.

Another object of this invention resides in the provision of a card dispensing machine that is capable of consistently dispensing a single card at a time.

Still another object of this invention resides in the provision of a card dispensing machine capable of operating to dispense the very last card from a stack in the magazine.

A further object of the present invention is to provide a card dispensing machine that may be adjusted to handle cards of different thicknesses and still only dispense a single card at a time.

Other objects, features and advantages of the invention will be apparent from the following detailed disclosure, taken in conjunction with the accompanying sheets of drawings, wherein like reference numerals refer to like parts, in which:

FIGS. 5 and 6 are fragmentary vertical sectional views taken through the machine and illustrating the operation of the card stripping units;

FIG. 7 is a perspective view of another embodiment of the present invention;

FIG. 8 is an exploded view of a modified card stripping unit as applied to the modification of FIG. 7;

FIG. 9 is a front elevational view of the embodiment of FIG. 7; and

FIG. 10 is a vertical sectional view taken through the embodiment of FIGS. 7-9 and substantially along line 10—10 of FIG. 9.

Figure 1:
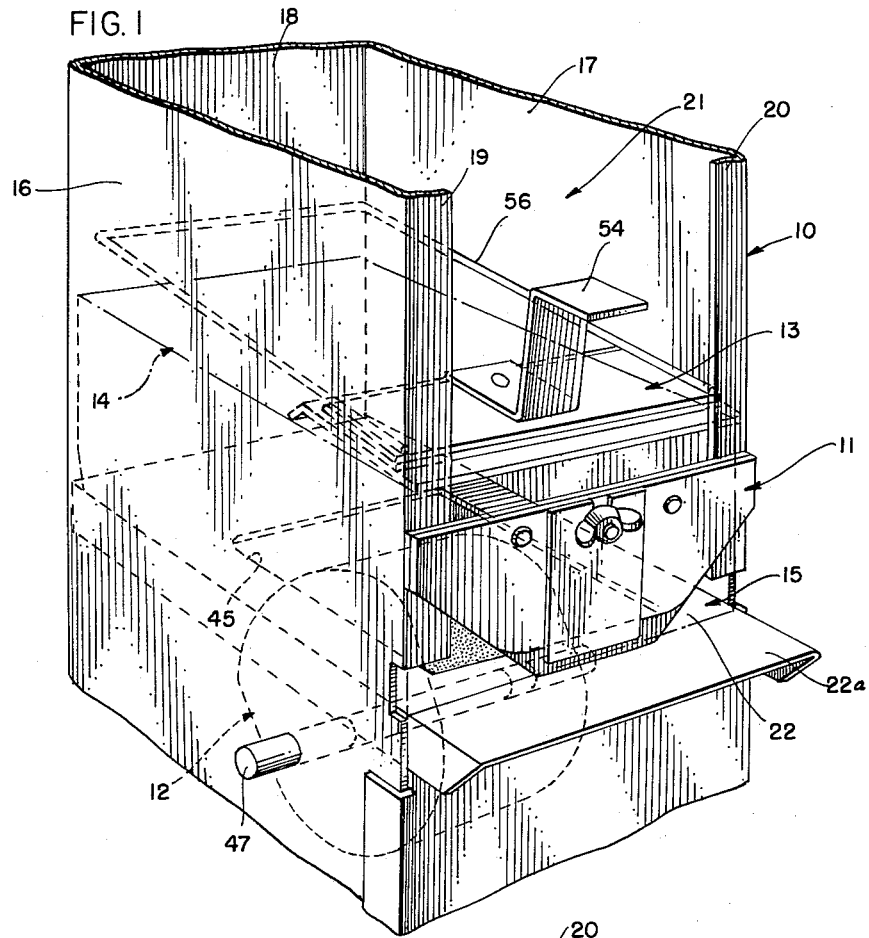
FIG. 1 is a perspective view of a card dispensing machine according to the present invention with some parts broken away for purposes of clarity.

Referring now to the drawings and to the embodiment of FIGS. 1-6 and more particularly to FIG. 1, the dispensing machine of this embodiment according to the present invention includes generally a magazine 10, a card stripping unit 11 for assuring one card at a time dispensing operation, a dispensing roller 12, and a card holddown assembly 13. The magazine 10 is adapted to receive a stack of cards 14 therein, and to maintain the cards in alignment and to feed them to a dispensing opening 15.

The magazine 10 includes opposed side walls 16 and 17, a rear wall 18, an open top for loading cards into the magazine, and flanges 19 and 20 extending toward each other from the opposed side walls 16 and 17 to define guide means at the front side of the magazine. The side walls, rear wall and front flanges define a cavity 21 that receives the stack of cards. The cards are supported by a bottom 22 that extends perpendicular to the side and rear wall and front flanges. A forwardly projecting extension 22a extends through the dispensing opening 15 and defines a continuation of the bottom 22 outside of the magazine 10.

Figure 2:
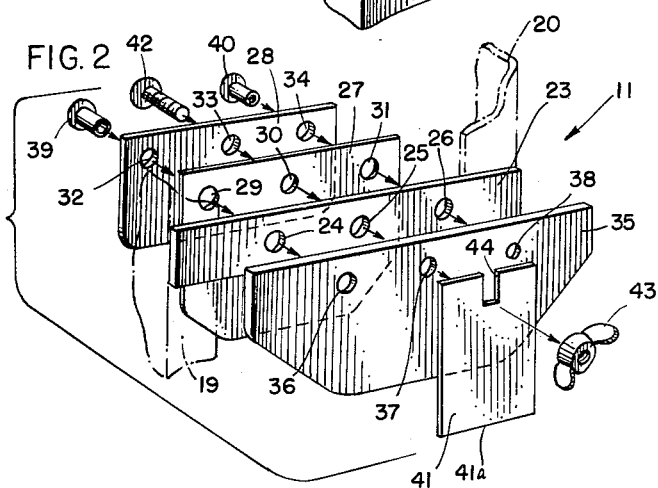
FIG. 2 is an exploded view of the card stripping unit employed to assure one card at a time dispensing operation in the present invention.
Figure 3:
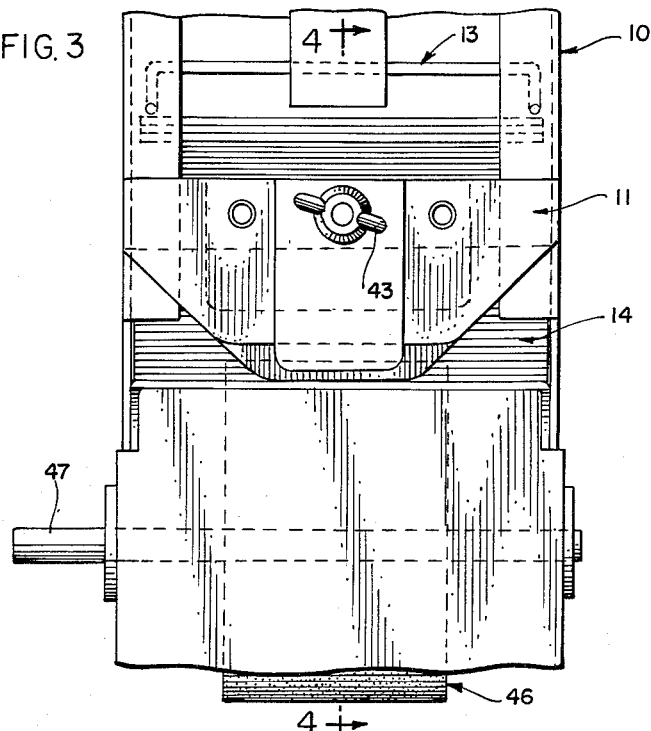
FIG. 3 is a front elevational view of the dispensing machine of FIG. 1, with some parts broken away for purposes of clarity.

As seen most clearly in FIG. 2, the card stripping unit 11 includes a mounting bar 23 extending between the front flanges 19 and 20 and being secured thereto in any suitable fashion, such as by welding or any other means. A plurality of longitudinally spaced holes 24, 25 and 26 are provided in the mounting bar 23. A thin flexible stripper plate 27 is in abutting relation on the back side of the mounting bar, and is sandwiched between the mounting bar and a rigid retaining plate 28. The flexible stripper plate 27 may be made of any suitable material, such as spring steel or plastic, but is preferably made of spring steel. The flexible stripper plate 27 is provided with spaced holes 29, 30 and 31 of substantially the same size and in the same spaced relation as the holes 24, 25 and 26 in the mounting bar 23. Similarly, the rigid retaining plate 28 includes spaced holes 32, 33 and 34 that are of substantially the same size and in alignment with the holes 29, 30 and 31 of the flexible plate 27. At the front side of the mounting bar 23, a stop plate 35 is in abutting relationship with the mounting plate and provided with holes 36, 37 and 38 of substantially the same size and in alignment with the holes 24, 25 and 26 of the mounting plate. A pair of fasteners, such as rivets 39 and 40, secure together the retaining plate 28, the flexible stripper plate 27, the mounting bar 23 and the stop plate 35, and also effectively mount the plates to the mounting bar. All of the plates extend downwardly from the mounting bar, and as seen most clearly in FIGS. 4, 5 and 6, the flexible stripper plate 27 is of such a length as to engage the bottom 22 when in the position as shown in FIG. 5. The stop plate 35 is of a length to be spaced above the bottom 22 a distance equal to several thicknesses of cards, while the retaining plate 28 is of such a length that the lower edge is spaced even further above the lower edge of the stop plate 35.

The position of the stripper plate 27 is adjusted by a stripper plate adjustor 41 that is adjustably mounted on the outside of the stop plate 35 and held in place by a bolt 42 extending through the center holes 33, 30, 25 and 37, and a wing nut 43. The upper end of the stripper plate adjustor is slotted at 44 to receive the bolt 42. Thus, loosening of the wing nut 43 will allow upward or downward movement of the stripper plate adjustor 41 and thereafter tightening of the wing nut will hold the adjustor in the desired position. The lower edge 41a of the adjustor 41 serves to limit the outward movement of the stripper plate 27 as shown in FIG. 6 and as will be more clearly explained hereinafter. The card stripping unit 11 serves to strip the bottommost card from the stack 14 during the dispensing cycle and to compensate for the card thickness, wherein the machine may handle and dispense cards of varying thicknesses. For example, if a stack of cards each of which has a greater thickness than that shown in the drawings is desired to be dispensed from the machine, the stripper plate adjustor 41 will be repositioned to allow the stripper plate to properly act in stripping a thicker card from the stack.

A rectangular-shaped opening 45 is provided in the bottom 22 for permitting to project therethrough means for exerting a force on the bottommost card to dispense same from the magazine. While any such means may be provided, a roller 46 is shown herein and preferred. The roller is mounted on a shaft 47 that extends parallel to the bottom 22 and perpendicular to the path of movement of the cards being dispensed. The roller includes a core 48 of any suitable material, such as wood or steel, that is fixed to the shaft 47 having secured to its exterior surface a cover 49 of resilient material, such as sponge rubber or the like. The cover 49 includes an eccentric portion 50 that projects through the opening 49 when in alignment therewith to engage the bottommost card of the stack and to exert a force thereagainst to cause it to be dispensed from the magazine. During the engagement between the eccentric portion 50 and the bottommost card, the eccentric portion will be slightly compressed and will even slightly raise the stack of cards from the bottom of the magazine as shown in exaggerated form in FIGS. 5 and 6. One card will be dispensed from the magazine during each revolution of the roller 46, and it will be appreciated that the roller will not completely discharge each card from the magazine, but will drive it to a position on the bottom extension 22a to permit grasping by hand or other means to thereafter completely discharge the card from the magazine. The roller 46 rotates in the direction indicated by the arrow 51.

Figure 4:
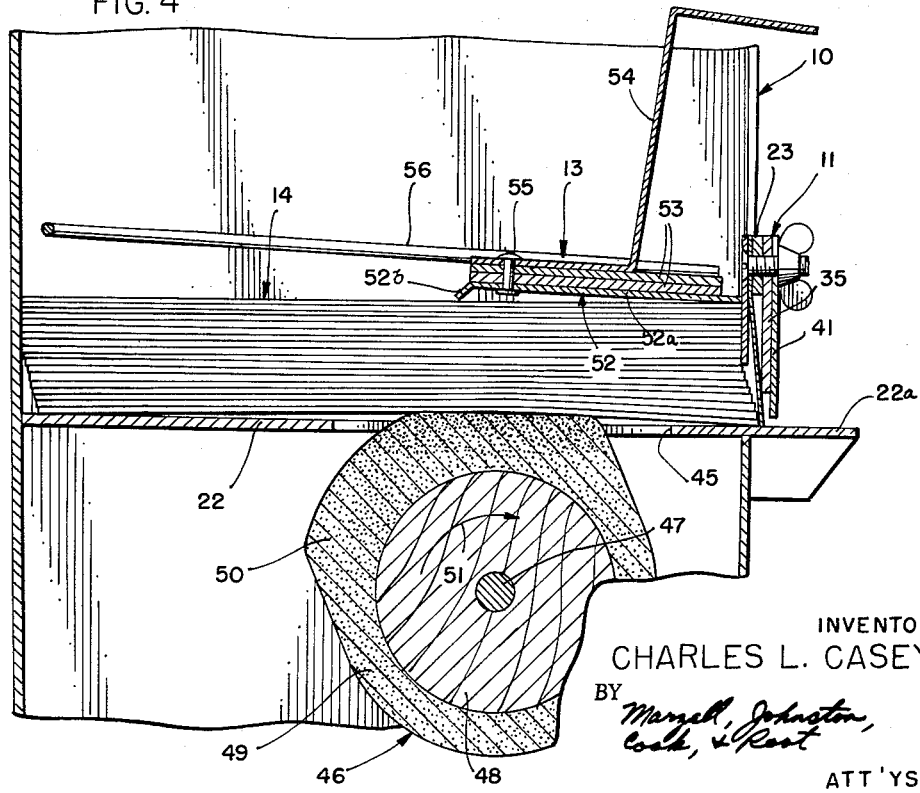
FIG. 4 is a vertical sectional view taken substantially along line 4—4 of FIG. 3.

During the dispensing cycles and the rotation of the roller 46, the lowermost cards in the stack 14 will have been urged toward the opening 15 as seen particularly in FIGS. 4, 5 and 6. This will cause the lowermost cards to advance beyond the rigid retaining plate 28 and urge the flexible stripper plate 27 against the stop plate 35 as seen particularly in FIG. 5. Thereafter, continued rotation of the roller 46 will urge the cards below the lower edge of the stop plate 35 to further push the stripper plate outwardly and against the stripper adjustor 41 as shown in FIG. 6 and then permit the dispensing of only the lowermost card between the lower edge of the stripper plate 27 and the supporting surface of the bottom 22, also shown in FIG. 6. The lower edge 41a of the stripper plate adjustor 41 is adjusted so that it is spaced from the surface of the bottom 22 a distance equal to approximately two thicknesses of the cards being dispensed from the magazine. This will allow the proper flexing of the stripper plate 27, but yet control the flexing so that no more than one card is dispensed from the magazine at one time during a single dispensing cycle of the roller 46. Thus, the card stripping unit 11 of the present invention coacts with the magazine bottom 22 and covers the opening 15 to assure that only one card at a time may be dispensed from the magazine.

The holddown 13 includes a lower plate 52 having a main body 52a and a downwardly inclined flange 52b at the rear edge. The plate 52 extends substantially the entire width of the magazine 10 but has a length which allows the flange 52b to terminate at a point substantially over the roller 46. A pair of weight plates 53 are mounted on top of the plate 52, and a Z-shaped handle 54 is mounted on top of the plates 53. A fastener 55 secures the plate and handles together. Suitably secured to the upper surface of the top weight plate 53 is a wire frame 56 that has a rectangular configuration slightly less than the inner dimensions of the magazine and serves to orient the holddown within the magazine and maintain the plates 52 and 53 at the forward end of the magazine as shown particularly in FIG. 4. The flange 52b serves to tip the holddown forward so that the weight is concentrated at the forward end areas of the stack. The holddown serves to urge the last few cards against the bottom 22 to assure proper dispensing thereof.

The embodiment of FIGS. 7–10 differs primarily in that the cards are dispensed from the top of the card stack, while in the embodiment of FIGS. 1–6, the cards are dispensed from the bottom of the card stack. Further, a slightly modified card stripping unit and dispensing roller is employed in this embodiment.

Referring now to FIGS. 7–10, the modified card dispensing unit includes upstanding side walls 60 and 61 and a rear wall 62 connected together in rectangular form. A card engaging plate 63 extends between the side walls 60 and 61 and form a point spaced slightly from the rear wall 62 to a point spaced forwardly of the forward edges of the side walls 60 and 61. Guide flanges 64 and 65 coact with the side walls 60 and 61 below the plate 63 to define the card magazine 66 that receives a stack of cards 67.

The stack of cards 67 is urged upwardly against the underside of the plate 63 by means of a coil spring 68 bottomed at one end on a pusher plate 69 that engages the lower end of the card stack 67, and at the other end on a removable support 70. A shallow cylindrical shell 71 is secured to the underside of the pusher plate 69 to provide a guide for maintaining the spring 68 in substantially centered position along the pusher plate 69. The removable support 70 includes a bottom panel 72 having upstanding side flanges 73 and 74 which is sized to be received between the side walls 60 and 61. Headed lugs 75 and 76 are suitably secured to the outer faces of the flanges 73 and 74 and adapted to be received in bayonet-type slots 77 and 78 formed in the side walls 60 and 61, respectively. In removing the support 70, it is necessary to urge it upwardly, slightly forwardly toward the front end of the machine and then allow it to drop in the bayonets slots. Conversely, the support 70 is replaced by pushing it upwardly in the bayonet slots rearwardly and then allowing the spring 68 to urge the headed lugs 75 and 76 downwardly to their seated positions as shown in FIGS. 7 and 10.

The guide flanges 64 and 65 terminate below the plate 63 to thereby define a card discharge opening 79. The uppermost cards are cammed forwardly and toward the discharge opening by means of an inclined plate 80 mounted adjacent the rear wall 62 and on the plate 63. Thus, the uppermost cards are given an initial movement toward the discharge opening prior to being discharged from the machine.

In order to dispense the cards one at a time from the magazine, an opening 81 is provided in the plate 63 to permit a driven roller 82 to extend therethrough and into engagegment with the uppermost card on the card stack 67. The roller 82 includes a core 83 mounted on a shaft 84 that is suitably journalled by the side walls 60 and 61, and a card gripping portion 85. Any suitable means may be provided to cyclically drive the roller 82 during the dispensing operation. The driven roller 82 differs from the roller 46 of the embodiment shown in FIGS. 1–6 in the construction of the gripping portion. While the gripping portion 50 of the roller 46 is essentially constructed to provide a smooth face to engage the card being dispensed, the gripping portion 85 of the embodiment of FIGS. 7–10 includes a roughened surface with which to engage the card to be dispensed. The gripping portion 85 includes a parti-circular base or pad 85 having a plurality of conically shaped protuberances or teats 87 which extend through the opening 81 in the plate 63 to engage the uppermost card in the stack 67. The entire gripping portion 85 is preferably constructed of rubber or the like flexible material, and as seen particularly in FIG. 10, the teats 87 bend and flex during engagement of the uppermost card and thereby apply a positive frictional drive to the card being dispensed.

Assurance that only one card at a time will be dispensed from the magazine discharge opening 79 is accomplished by providing a card stripping unit 88 which essentially restricts the discharge opening 79 so that only one card may pass therethrough at one time. Essentially, this card stripping unit operates similar to the card stripping unit 11 of the first embodiment, however it differs slightly therefrom in construction.

The card stripping unit 88 includes a rigid backing plate 89, a spring plate 90, and a stop plate 91, all provided with a series of aligned holes 92 to receive fasteners 93 so that the card stripping unit can be securely mounted on the upper ends of the guide flanges 64 and 65. Each of the elements of the card stripping unit has its upper corner bevelled to prevent accidental engagement thereby with the side edges of a card being dispensed.

The spring plate 90 of the card stripping unit includes a plurality of card engaging fingers 94, three in this instance although any number may be provided, each of which has its upper ends 94a slightly bent in the direction of card dispensing movement. The upper bent portions 94a are arranged to extend slightly above the upper edge of the rigid plate 89, as seen particularly in FIG. 10. During the dispensing action, a card is advanced forwardly by the driven roller 82 and then engages the bent portion 94a of the fingers 94 and pushes it outwardly until the fingers are stopped by the upper outwardly inclined portion 91a of the stop plate 91. The positioning of the stop plate 91a is such that it will permit the fingers to flex a distance so that only one card will pass between the ends of the fingers 94 and the plate 63, thereby assuring the dispensing of one card at a time from the magazine. Again, cards of varying thickness may be dispensed as in the first embodiment by adjusting the length or positioning of the stop plate 91. In general, the operation of this embodiment is like that of FIGS. 1-6.

It will be understood that modifications and variations may be effected without departing from the scope of the novel concepts of the present invention, but it is understood that this application is to be limited only by the scope of the appended claims.

The invention is hereby claimed as follows:

1. A machine for storing a stack of cards and for dispensing the cards one at a time, said machine comprising an upstanding magazine adapted to receive a stack of cards, said magazine including front, back and opposed side guide means for maintaining said cards in aligned relation and a horizontal plate extending between said guide means, means for urging said cards against said plate, said horizontal plate extending outward of said front guide means, a dispensing opening in said front guide means, an opening in said horizontal plate and means extending therethrough into engagement with the endmost card for dispensing the cards one at a time through said dispensing opening, and a card stripping unit mounted at said front guide means coacting with said horizontal plate to hold back all cards except the endmost card during the dispensing cycle, said card stripping unit including a rigid retaining plate extending across said front guide means and being spaced from said horizontal plate, a flexible stripper plate against said retaining plate and engaging said horizontal plate between dispensing cycles, a mounting bar against said flexible stripper plate and spaced from said horizontal plate a distance greater than said retaining plate, a stop plate over said mounting plate and spaced from said horizontal plate a distance less than said retaining plate, and an adjustor plate over said stop plate spaced from said horizontal plate a distance less than said stop plate to limit the movement of said stripper plate in accordance with the thickness of a card dispensed from the machine, said stop plate stopping outward movement of said stripper plate before engagement of said stripper plate with said adjustor plate.

2. The machine as defined in claim 1, wherein said flexible stripper plate comprises a plurality of spring fingers normally extending substantially parallel to the path of discharge of said cards.

3. The machine as defined in claim 1, wherein said means extending through said horizontal plate includes a driven roller having a gripping portion along a part thereof for sequentially engaging the endmost card.

4. The combination as defined in claim 3, wherein said gripping portion is of sponge rubber.

5. The combination as defined in claim 3, wherein said gripping portion includes a plurality of resilient teats.

References Cited by the Examiner

UNITED STATES PATENTS

| | | | |
|---|---|---|---|
| 333,073 | 12/1885 | Hoyt | 221—231 |
| 416,340 | 12/1889 | Moodie | 221—259 |
| 479,688 | 7/1892 | Weller | 221—231 |
| 1,466,492 | 8/1923 | Stiriss | 221—241 |
| 1,477,501 | 12/1923 | Keenan | 221—267 |
| 1,741,295 | 12/1929 | Haberer | 221—250 |
| 2,036,921 | 4/1936 | Christmas | 221—250 |
| 2,078,984 | 5/1937 | Williamson | 221—259 |
| 2,200,842 | 5/1940 | Gray | 271—41 |
| 2,369,955 | 2/1945 | Eastman | 221—259 |
| 2,426,995 | 9/1947 | Gibbs | 221—279 |

FOREIGN PATENTS

| | | |
|---|---|---|
| 373,500 | 5/1907 | France. |

RAPHAEL M. LUPO, *Primary Examiner.*

HADD S. LANE, RAPHAEL M. LUPO, *Examiners.*